United States Patent [19]

Schneider et al.

[11] 4,121,570
[45] Oct. 24, 1978

[54] SAUNA STOVE

[75] Inventors: Wolfgang Schneider; Dieter Wieland; Günter Rennecke, all of Schwäbisch Hall, Fed. Rep. of Germany

[73] Assignee: Klafs-Saunabau KG, Medizinische Technik, Schwabisch Hall, Fed. Rep. of Germany

[21] Appl. No.: 758,649

[22] Filed: Jan. 12, 1977

[30] Foreign Application Priority Data

Jan. 14, 1976 [DE] Fed. Rep. of Germany ....... 2601173

[51] Int. Cl.² .............................................. F24H 1/22
[52] U.S. Cl. ................... 126/374; 126/351; 126/363; 126/364; 200/61.7
[58] Field of Search ........................ 126/344, 373, 351; 4/160; 128/367; 200/85 R, 153 T, 330, 332, 333, 334, 61.7; 219/363–365, 444

[56] References Cited

U.S. PATENT DOCUMENTS 2,152,261  3/1939  Kahn ..................................... 219/444
3,708,651  1/1973  Neville ................................. 219/365

Primary Examiner—John J. Camby
Assistant Examiner—Larry I. Schwartz
Attorney, Agent, or Firm—Max Fogiel

[57] ABSTRACT

A sauna stove arrangement with an electric heater and an exit opening for hot air. At a distance above the hot air exit opening, a vertically movable protective cover is provided. A trigger release member is connected to the protective cover and moves within a path of motion of a switch which disconnects the heater. The protective cover is movable downward against the action of a spring, and forms at least part of the lever arm of a beam balance having another lever arm constructed as the trigger for the switch. The protective cover, furthermore, forms the longer lever arm of the beam balance, and the shorter lever arm has a counterpoise which keeps the beam balance in equilibrium if there is no load on the protective cover. The beam balance is supported at a wall adjacent to the sauna stove, and its shorter lever arm projects partially into a recess in the wall in which the switch is located.

13 Claims, 4 Drawing Figures

SAUNA STOVE

BACKGROUND OF THE INVENTION

The present invention relates to a sauna stove with a heating device, for example an electrical heater, and an exit opening for the hot air. Known sauna stoves, equipped with electrical, gas or liquid fuel heaters and where as a rule the warm air exit opening is provided above the heater, have the disadvantage that the warm air exit opening, which in most cases is covered with a grid etc., is used for storing combustible objects, as for example, head rests, cleaning rags, handkerchiefs, bathing suits, etc. In this case there is an acute fire hazard, when the heater is turned on with such items present.

It is, therefore, an object of the present invention to provide a sauna stove with an arrangement such that secure protection against unintentional burning of combustible objects deposited on the sauna stove is ensured.

Another object of the present invention is to provide a sauna stove of the foregoing character which has a protective arrangement, as described, and which is substantially simple in constuction and may be economically fabricated.

A further object of the present invention is to provide a protective arrangement for sauna stoves, which has a substantially long operating life and is reliable in service.

SUMMARY OF THE INVENTION

The objects of the present invention are achieved by providing that at a distance above the hot air exit opening, a protective cover, which can be moved upward, is provided with a trigger having a path of motion in which a shut-off switch for the heater is located.

The arrangement is made so that the protective cover, upon deposition of any object, is movable downward against the resistance of a spring from its rest position; during this motion the trigger actuates the shut-off switch for the heater.

With a preferred embodiment of this invention, the vertically movable protective cover is in the form of a lever arm of a balance beam whose other lever arm actuates the shut-off switch for the heater. This other lever arm may be shorter than the lever arm formed by the protective cover, if, as weight compensation for the weight of the protective cover, a suitably dimensioned couterpoise or a suitably dimensioned spring, hydraulic or pneumatic piston, etc. is provided.

As shut-off switches, particularly if the sauna stove has an electric heater, one may use microswitches which, upon movement of the protective cover or a part connected to this protective cover, interrupt the heater circuit. Such switches are connected to a warning device which delivers an acoustic and/or optical (visual) signal when a weight is applied to the protective cover and/or when the protective cover is removed, as for example, for cleaning. In addition to the necessary interruption of the heater circuit, there is a simultaneous additional acoustic and/or optical (visual) check on the heater. This check also constitutes a monitoring of the functioning of the switches.

The present invention results in a reliable shut-off of the heater of a sauna stove as soon as any object is deposited on the protective cover which is located above the heat exit opening of the sauna stove. This removes the fire hazard existing with all known sauna stoves in an optimum fashion. As soon as the object deposited on the protective cover is removed from it, the protective cover returns to its ordinary position and the heater is automatically turned on again.

The novel features which are considered as characteristic for the invention are set forth in particular in the appended claims. The invention itself, however, both as to its construction and method of operation, together with additional objects and advantages thereof, will be best understood from the following description of specific embodiments when read in connection with the accompanying drawings.

DESCRIPTION OF THE PREFERRED EMBODIMENTS

Figure 1:
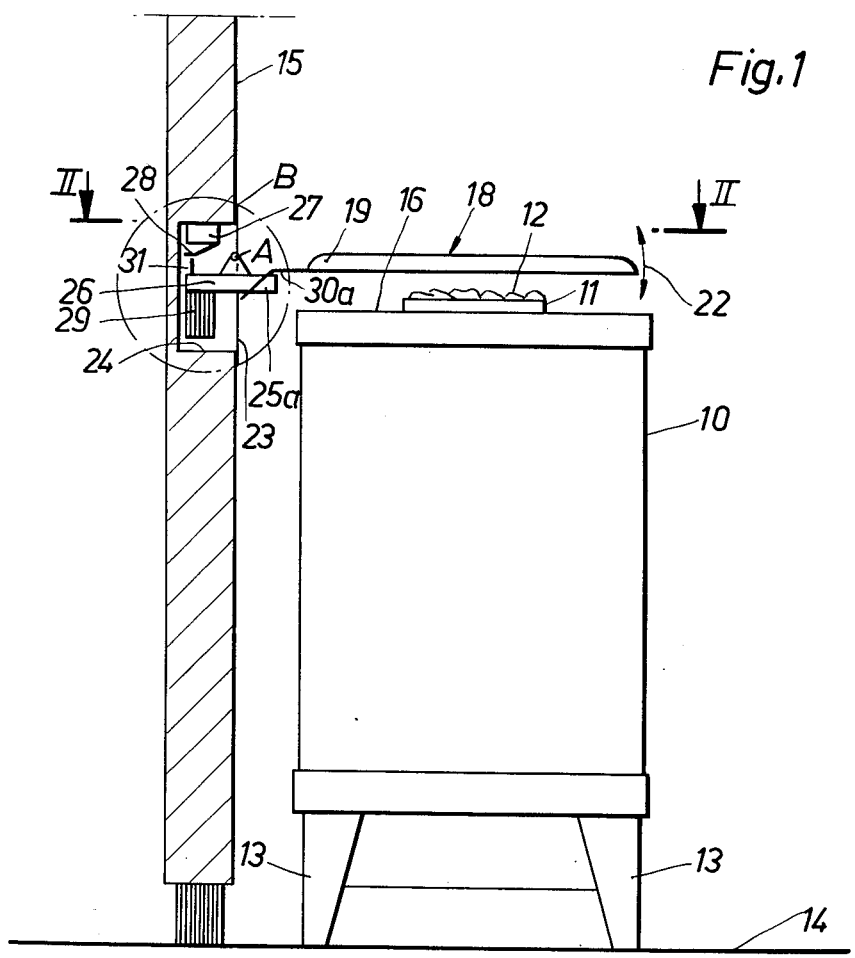
FIG. 1 shows a schematic of a sauna heater with a protective cover in accordance with the present invention in a side view and a section taken along line I—I of FIG. 2.
Figure 2:
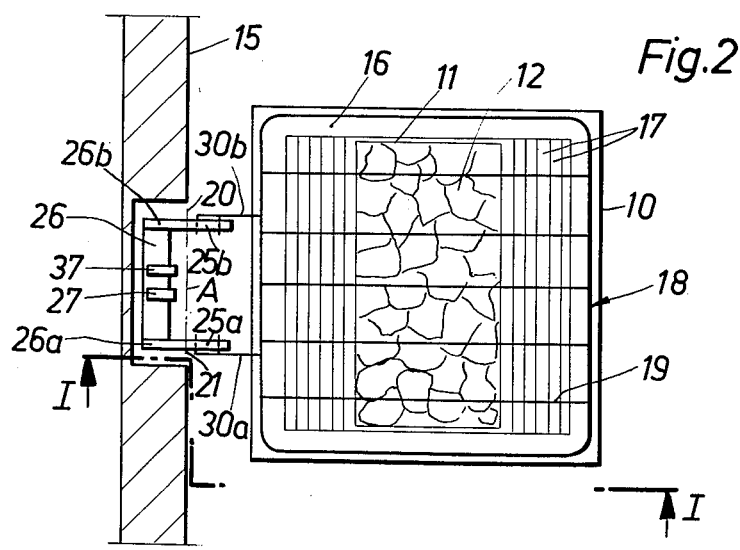
FIG. 2 shows a top view of the heater and a section taken along line II—II of FIG. 1.

In FIGS. 1 and 2, 10 denotes a sauna stove which has an electrical heater (not shown) or another type of heater, as for example a gas, liquid fuel or similar heater, and a basket 11 with rocks 12. The latter rests on legs 13 on the floor 14 of the sauna room. In this embodiment, directly next to the sauna stove 10 there is a wall 15 which is shown in section in FIGS. 1 to 3. The air to be heated enters in conventional fashion at the bottom of the sauna stove 10, is heated there by the heater and exits via the warm air exit opening 16 which is provided with slots.

Above the warm air exit opening 16 and covering it completely, there is a protective cover 18. In this embodiment — see FIG. 2 — it is a ribbed grid with ribs 19 arranged in the flow direction of the hot air.

Figure 3:
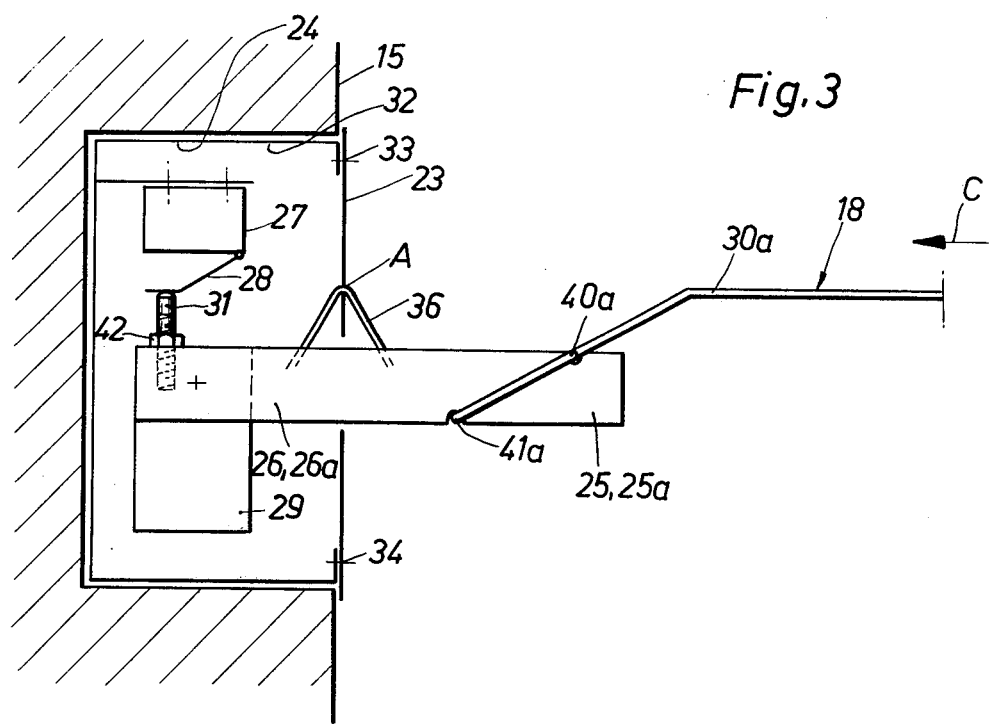
FIG. 3 shows an enlarged detail B of FIG. 1.
Figure 4:
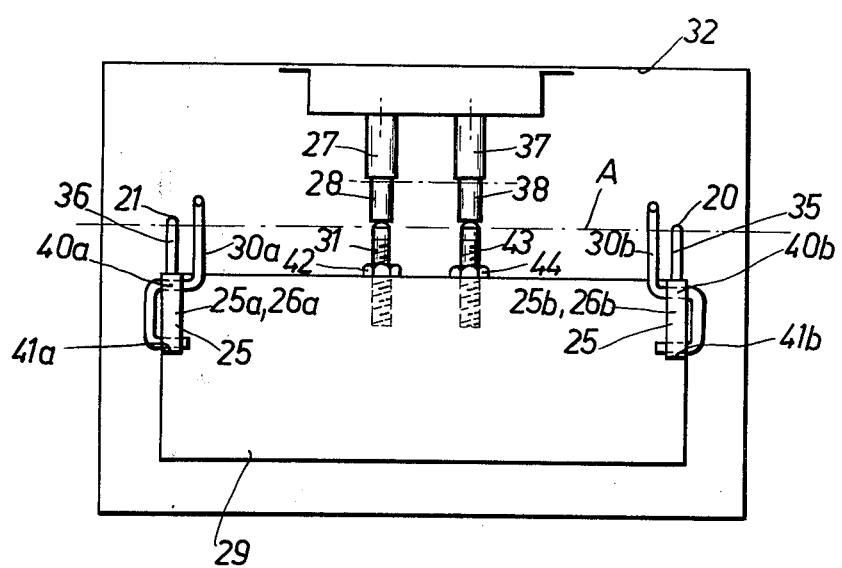
FIG. 4 shows the subject of FIG. 3, seen in the direction of arrow C (with the wall cover omitted).

The protective cover 18 forms a lever arm of a balance beam whose other lever arm 26, which preferably is shorter, actuates a switch, preferably a microswitch 27. The balance beam 18, 26 formed by the protective cover as longer lever arm and the shorter lever arm 26 pivots about an axis of rotation A (FIG. 4). This axis of rotation A with the embodiments shown in FIGS. 1 and 3 is directly connected to a cover 23 which covers a recess 24 in the outer wall 15. The protective cover 18, in the embodiment shown, is connected in a detachable manner with two parallel lever sections 25a, 25b. The shorter lever arm sections 26a, 26b of the shorter balance beam 26 form a carrier for the balance beam 18, 26. The carrier has two yokes and can be pivoted about fulcrums 20, 21 of the cover 23. The shorter balance beam 26, which in the embodiment comprises lever arm sections 26a, b, projects with them into the recess 24 of the outer wall 15. This recess 24 may be closed by a housing 32 made of sheet metal, or plastic etc. and covered with a cover 23. The cover is fastened at 33, 34 by screws to housing 32.

Inside the wall recess there are two microswitches 27, 37 which have a contact pin or a contact arm 28 or 38. The shorter lever arm 26 which in the emobodiment is formed by lever arm sections 26a, 26b, mounts a counterpoise 29 whose weight is such that it balances the weight of the longer lever arm 18 of the balance beam. Hence the weight of the protective cover 18 including the weight of a carrier 25 connected to it, which carrier comprises struts 25a, 25b, together with the weight of the lever arm sections 26a, 26b of the lever arm 26. In the embodiment shown, the protective cover 18 has two struts 30a, 30b, which — as shown in FIGS. 1 and 3 — are bent downwards and offset hooklike inwards (FIG. 4). They engage associate recesses 40a, 41a or 40b, 41b of lever sections 25a, 25b in a form-linked manner, but detachably so that the protective cover 18 can be easily removed, for example, for cleaning purposes.

The two microswitches 27, 37 are connected to their contact pins or arms 28, 38 with pressure pins 31 and 43 which are located on the shorter balance beam.

The arrangement in accordance with the present invention operates as follows: If an object, for example a handkerchief, cleaning rag, bathing trunks, etc. is placed on the protective cover 18, the balance beam 18, 26, which is balanced by the counterpoise 29 or a spring is deflected from its equilibrium position in such a way that its longer balance beam arm 18, the protective cover, is deflected downward. At the same time, the shorter lever arm 26 of the balance beam swings upwards. As a result, the pressure pin, 31 which is fastened to the shorter balance beam 26, e.g., to the counterpoise 29 and is secured by a nut 42 and which may also be a yoke etc., contacts the contact pin or arm 28 of microswitch 27 so that it is actuated and the heater circuit of the sauna stove 10 is interrupted. This prevents the object deposited on the protective cover 18 from the catching fire.

The arrangement in accordance with the present invention provides that when depositing even the smallest and lightest object on the protective cover, e.g., a thin piece of paper, the balance beam is deflected from its equilibrium, and the shut-off switch 27 for the heater is actuated.

In accordance with a further embodiment of the present invention, in the equilibrium state of the balance beam 18, 26, a second pressure pin 43 — which is constructed as pressure pin 31, is fastened to counterpoise 29 and secured by a nut 44, engages contact pin or contact arm 38 of a second microswitch 37 (FIG. 4). This closes the heater circuit of the sauna stove 10. In contrast with the first microswitch 27, the second microswitch 37 is constructed so as to interrupt the heater circuit when the otherwise constant pressure of pin 43 on the contact pin 38 is interrupted. This is the case when the lever arm of the balance beam 18, 26 descends upon removal of the protective cover 18, for example, when cleaning. Thus a fire hazard is automatically eliminated when protective cover 18 is removed. This is important because especially with the protective cover removed, there is a danger that combustible objects such as head rests, cleaning rags, etc., may be deposited on the protective cover while cleaning the sauna or the sauna stove.

It is conceivable to provide as second microswitch 37 a switch corresponding to the first microswitch 27 to interrupt the heater circuit if there is pressure on the contact arm. In this case, the second microswitch 37 may be located underneath the counterpoise 29, with the pressure on its contact arm being exerted directly by the counterpoise 29 or a pressure pin of yoke attached to it.

The fulcrums 20, 21 of the protective cover 18 and/or the switches 27, 37 and/or the counterpoise 29 may also be located outside the outer wall 15. This will be expedient and necessary when the outer wall 15 is too far away from the sauna stove. In this case, the fulcrums 20, 21 or the axis A and the switches 27 or 37 may be located on the sauna stove 10 or on a part connected to it, as for example, an extension. The fulcrum bearing 20, 21 of the balance beam 18, 26 or another bearing about the axis of rotation A is made so low in friction that it is enough when a comparatively small weight of only 4 to 5 grams is placed on the protective cover 18, to move the entire balance beam 18, 26 from its equilibrium and to actuate the microswitch 27 and to shut off the heater. This ensures that even when depositing very light objects, for example, paper napkins, etc., the heater of the sauna stove is shut-off and any danger of fire is eliminated.

It is further possible to shut-off the heater directly or indirectly without making the protective cover a lever arm of a balance beam. The protective cover might be located directly on the stove in such a way that upon depositing an object, against the force of a support spring, a set spring path is traversed and the trigger for the switch of the heater is set off in this manner. The protective cover can be constructed in any manner, for example as grid, parallel or rib grating or as perforated plate, etc.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A sauna stove comprising: stove housing means; heater means in said stove housing means and having on and off operating positions; said stove housing means having exit opening means for hot air heated by said heater means; a pivotably mounted protective cover above said exit opening means and spaced therefrom; said pivotably mounted cover having a free end; trigger release means connected to said cover and having a path of motion; and switch means located in said path of motion and connected to said heater means; said switch means being actuated by said trigger release means for switching said heater means to said off operating position when the free end of said cover moves vertically downward; and spring means linked to said protective cover, said free end of said cover being movable downward against the action of said spring means.

2. The sauna stove as defined in claim 1 including beam balance means having a first lever arm formed by said protective cover, said beam balance means having a second lever arm comprised as said trigger means.

3. The sauna stove as defined in claim 2 wherein said first lever arm formed by said protective cover is substantially longer than said second lever arm; and counterpoise means on said second lever arm for maintaining said beam balance means in said equilibrium condition in the absence of a load on said protective cover.

4. The sauna stove as defined in claim 3 wherein said beam balance means is supported at a wall adjacent to said sauna stove, said wall having a recess, said second lever arm projecting at least partially into said recess, said switch means being located in said recess.

5. The sauna stove as defined in claim 2 wherein said protective cover is detachably connected to said beam balance means.

6. The sauna stove a defined in claim 2 including means for carrying said beam balance means; and means for detachably connecting said protective cover to said carrying means.

7. The sauna stove as defined in claim 6 including lateral struts on said protective cover, said carrying means comprising two parallel struts, said carrying means having recesses, said two lateral struts engaging said recesses of said carrying means.

8. The sauna stove as defined in claim 3 including auxiliary switch means actuated by said second lever arm of said beam balance means for switching said heater means to said off operating position when said protective cover is removed.

9. The sauna stove as defined in claim 8 wherein said first-mentioned switch means and said auxiliary switch means comprise microswitches.

10. The sauna stove as defined in claim 1 wherein said protective cover is comprised of ribbed grating or perforated plate means.

11. The sauna stove as defined in claim 8 including audio-visual warning means connected to said first-mentioned switch means and said auxiliary switch means for providing an audio-visual warning signal.

12. The sauna stove as defined in claim 1 wherein said spring means has a part connected to said stove, said part of said spring means being in the path of motion of said protective cover.

13. The sauna stove as defined in claim 1 wherein said exit opening means is located at an upper face side of said stove housing means; said protective cover comprising an open meshed grating means pivoted about a horizontal axis; said protective cover lying in a horizontal plane when in protective position; said switch means retaining said heater means in operative state when said protective cover lies substantially in said horizontal plane; said switch means switching said heater means to said off operating position when an object placed on said protective cover pivots said cover downward towards said air exit opening means, said switch means also switching said heater means to said off operating position when said protective cover is pivoted upward away from said air exit opening means.

* * * * *